United States Patent
Milligan et al.

(10) Patent No.: US 9,787,482 B2
(45) Date of Patent: Oct. 10, 2017

(54) REDUNDANTLY POWERED AND DAISY CHAINED POWER OVER ETHERNET

(71) Applicant: Raytheon BBN Technologies Corp., Cambridge, MA (US)

(72) Inventors: Stephen D. Milligan, Stow, MA (US); Dale Gordon Robertson, Billerica, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 57 days.

(21) Appl. No.: 14/884,307

(22) Filed: Oct. 15, 2015

(65) Prior Publication Data
US 2016/0036595 A1     Feb. 4, 2016

Related U.S. Application Data

(62) Division of application No. 13/826,276, filed on Mar. 14, 2013, now abandoned.

(51) Int. Cl.
*H04L 12/10*      (2006.01)

(52) U.S. Cl.
CPC ................................. *H04L 12/10* (2013.01)

(58) Field of Classification Search
CPC ...................................................... H04L 12/10
See application file for complete search history.

(56) References Cited

U.S. PATENT DOCUMENTS

| | | | |
|---|---|---|---|
| 6,000,042 A | 12/1999 | Henrie | |
| 6,252,518 B1 * | 6/2001 | Laborde | E21B 47/12 340/855.3 |
| 6,810,481 B1 | 10/2004 | Kawade et al. | |
| 6,999,505 B2 | 2/2006 | Yokoo et al. | |
| 7,253,671 B2 * | 8/2007 | Hall | H03K 23/52 327/162 |
| 7,263,620 B2 | 8/2007 | Bresniker et al. | |
| 7,324,354 B2 | 1/2008 | Joshi et al. | |
| 7,664,136 B2 * | 2/2010 | Toebes | G06F 1/266 370/463 |
| 7,809,960 B2 | 10/2010 | Cicchetti et al. | |
| 7,836,336 B2 | 11/2010 | Biederman et al. | |
| 7,881,229 B2 | 2/2011 | Weinstein et al. | |
| 8,174,403 B2 * | 5/2012 | Kamata | E21B 47/12 166/77.2 |

(Continued)

FOREIGN PATENT DOCUMENTS

WO     2010/072701 A1     7/2010

*Primary Examiner* — Thienvu Tran
*Assistant Examiner* — Pinping Sun
(74) *Attorney, Agent, or Firm* — Lando & Anastasi, LLP

(57) ABSTRACT

According to one aspect, embodiments of the invention provide a method for providing power to a distributed sensor system, the method comprising providing power from at least one port of an interface unit to a first port of a first sensor unit of at least one of a plurality of sensor strings, powering up the first sensor unit, forwarding power from a second port of the first sensor unit to a first port of a second sensor unit of the at least one of the plurality of sensor strings, powering up the second sensor unit, monitoring the plurality of sensor strings for a fault condition, and in response to detecting a fault condition in a first sensor string of the plurality of sensor strings, providing power from a second one of the plurality of sensor strings to the first sensor string.

7 Claims, 5 Drawing Sheets

(56) References Cited

U.S. PATENT DOCUMENTS

| | | |
|---|---|---|
| 8,705,341 B2 | 4/2014 | Robitaille et al. |
| 2004/0073597 A1 | 4/2004 | Caveney et al. |
| 2006/0149978 A1* | 7/2006 | Randall ................ G06F 1/3203 713/300 |
| 2007/0288771 A1 | 12/2007 | Robbins |
| 2009/0031152 A1* | 1/2009 | Bolderl-Ermel ........ G06F 1/266 713/300 |
| 2011/0026525 A1 | 2/2011 | He |
| 2011/0197945 A1 | 8/2011 | Schaacke |
| 2014/0265550 A1 | 9/2014 | Milligan et al. |

\* cited by examiner

REDUNDANTLY POWERED AND DAISY CHAINED POWER OVER ETHERNET

RELATED APPLICATIONS

This application is a divisional of pending U.S. patent application Ser. No. 13/826,276 filed on Mar. 14, 2013, entitled REDUNDANTLY POWERED AND DAISY CHAINED POWER OVER ETHERNET, which is incorporated herein by reference in its entirety.

BACKGROUND OF THE DISCLOSURE

Field of the Invention

Aspects of the present invention relate generally to communication systems and more specifically to Power over Ethernet (PoE) technology.

Discussion of Related Art

PoE technology describes a standardized system to pass electrical power and data to a device on Ethernet cabling. PoE is commonly used for point to point power of single devices from an Ethernet switch. For example, a PoE system is typically configured in a "star topology" where one switch may provide both Ethernet switching and power supply functionality to one device on each one of the switches' ports. Standards such as the IEEE 802.3af and 802.3at PoE specifications provide a framework for delivery of power and data to a device via Ethernet cabling.

SUMMARY

Aspects in accord with the present invention are directed to a distributed sensor network, the network comprising an interface unit comprising a plurality of ports, and a plurality of sensor strings, each sensor string comprising a plurality of sensor units coupled in series to one of the plurality of ports of the interface unit, wherein each one of the plurality of sensor units within a sensor string is configured to be provided both power and network connectivity via a first cable from one of the interface unit and an adjacent one of the plurality of sensor units within the sensor string and also to provide both power and network connectivity via a second cable to an adjacent one of the plurality of sensor units within the sensor string, and wherein a first string of the plurality of sensor strings is configured to be coupled to a second string of the plurality of sensor strings and wherein at least one of the plurality of sensor units within the first string is configured to provide power to at least one of the plurality of sensor units within the second string.

According to one embodiment, each one of the plurality of sensor units within a sensor string comprises a first port configured to be coupled to one of the interface unit and an adjacent one of the plurality of sensor units within the sensor string via the first cable, and a second port configured to be coupled to one of the interface unit and an adjacent one of the plurality of sensor units within the sensor string via the second cable, wherein the first port and the second port are both configured to be provided both power and network connectivity from one of the interface unit and an adjacent one of the plurality of sensor units within the sensor string via the first cable and to provide power and network connectivity to an adjacent one of the plurality of sensor units within the sensor string via the second cable.

According to another embodiment, the second port of the at least one of the plurality of sensor units within the first string is configured to be coupled to the second port of the at least one of the plurality of sensor units within the second string. In one embodiment, the first port is configured to be coupled to one of the interface unit and an adjacent one of the plurality of sensor units within the sensor string via Ethernet cabling, and the second port is configured to be coupled to one of the interface unit and an adjacent one of the plurality of sensor units within the sensor string via Ethernet cabling.

According to one embodiment, each one of the plurality of sensor units further comprises a switch coupled between the first port and the second port, a power supply coupled to the switch, a downstream transformer coupled between the first port and the switch, an upstream transformer coupled between the second port and the switch, a downstream center tap coupled between the downstream transformer and the power supply, and an upstream center tap coupled between the upstream transformer and the power supply, wherein the downstream center tap is configured to provide power from the downstream transformer to the power supply, and wherein he upstream center tap is configured to provide power from the upstream transformer to the power supply.

According to another embodiment, each one of the plurality of sensor units further comprises a control processor coupled to the power supply, and a controller coupled to the control processor, the downstream center tap and the upstream center tap, wherein, in response to the downstream center tap providing power from the downstream transformer to the power supply and to a determination that an adjacent sensor unit has been coupled to the second port, the interface unit is configured to operate the control processor to send a forward power control signal to the controller to operate the controller to forward power from the downstream center tap to the upstream center tap, and wherein, in response to the upstream center tap providing power from the upstream transformer to the power supply and to a determination that an adjacent sensor unit has been coupled to the first port, the interface unit is further configured to operate the control processor to send a forward power control signal to the controller to operate the controller to forward power from the upstream center tap to the downstream center tap.

According to one embodiment, the controller is a "Hot-Swap" controller. In another embodiment, the distributed sensor network further comprises an opto-coupler coupled between the control processor and the controller to provide isolation.

According to another embodiment, the first string of the plurality of sensor strings is configured to be coupled to a first port of the plurality of ports of the interface unit, the second string of the plurality of sensor strings is configured to be coupled to a second port of the plurality of ports of the interface unit, and the first string and second string are configured to form a sensor loop between the first port and the second port.

According to one embodiment, the first port of a first one of the plurality of sensor units within the first string of the plurality of sensor strings is coupled to the first port of the plurality of ports of the interface unit, the first port of a second one of the plurality of sensor units within the first string of the plurality of sensor strings is coupled to the second port of the first one of the plurality of sensor units within the first string, and the first one of the plurality of sensor units within the first string is configured to receive power from the interface unit via the first port and to provide power to the second one of the plurality of sensor units within the first string via the second port of the first one of the plurality of sensor units.

Another aspect in accord with the present invention is directed to a method for providing power to a distributed sensor system, the distributed sensor system comprising an interface unit having a plurality of ports, and a plurality of sensor strings, each sensor string comprising a plurality of sensor units coupled in series to one of the plurality of ports of the interface unit, the method comprising providing power from at least one port of the interface unit to a first port of a first sensor unit of at least one of the plurality of sensor strings, powering up the first sensor unit, forwarding power from a second port of the first sensor unit to a first port of a second sensor unit of the at least one of the plurality of sensor strings, powering up the second sensor unit, monitoring the plurality of sensor strings for a fault condition, and in response to detecting a fault condition in a first sensor string of the plurality of sensor strings, providing power from a second one of the plurality of sensor strings to the first sensor string to provide power to at least one of the plurality of sensor units within the first sensor string.

According to one embodiment, monitoring the plurality of sensor strings for a fault condition comprises monitoring the second port of the first sensor unit for an open-circuit or short-circuit condition while power is being forwarded to the first port of the second sensor unit.

According to another embodiment, forwarding power from the second port of the first sensor unit to the first port of a second sensor unit comprises providing power from the second port of the first sensor unit to the first port of a second sensor unit at a first current level, the first current level sufficient to power only the second sensor unit, determining if the second sensor unit has powered up correctly in response to the power provided by the first sensor unit at the first current level, and in response to a determination that the second sensor unit has powered up correctly, providing power from the second port of the first sensor unit to the first port of a second sensor unit at a second current level, the second current level greater than the first current level and sufficient to power a third sensor unit coupled to a second port of the second sensor unit.

According to one embodiment, the method further comprises forwarding power from the second port of the second sensor unit to a first port of the third sensor unit powering up the second sensor unit, and powering up the third sensor unit.

According to another embodiment, providing power from the second one of the plurality of sensor strings to the first sensor string in response to detecting a fault condition in the first sensor string comprises identifying a location of the fault condition within the first sensor string, and providing power from the second one of the plurality of sensor strings to a group of sensor units within the first sensor string, the group of sensor units within the first sensor string coupled between the second sensor string and the location of the fault condition. In another embodiment, providing power from the second one of the plurality of sensor strings to a group of sensor units coupled between the second sensor string and the location of the fault condition comprises forwarding power from a second port of a third sensor unit within the second one of the plurality of sensor strings to a second port of a third sensor unit within the first one of the plurality of sensor strings, powering up the third sensor unit within the first one of the plurality of sensor strings, and monitoring the second port of the third sensor unit within the second one of the plurality of sensor strings for a fault condition while power is being forwarded to the second port of the third sensor unit within the first one of the plurality of sensor strings.

According to one embodiment, the method further comprises in response to a determination that a fault condition at the second port of the third sensor unit within the second one of the plurality of sensor strings does not exist, forwarding power from a first port of the third sensor unit within the first one of the plurality of sensor strings to a second port of a fourth sensor unit within the first one of the plurality of sensor strings, powering up the fourth sensor unit within the first one of the plurality of sensor strings, and monitoring the second port of the third sensor unit within the first one of the plurality of sensor strings for a fault condition while power is being forwarded to the second port of the fourth sensor unit within the first one of the plurality of sensor strings. In another embodiment, the method further comprises providing data from the at least one port of the interface unit to the first port of the first sensor unit of at least one of the plurality of sensor strings, and forwarding data from the second port of the first sensor unit to the first port of the second sensor unit of the at least one of the plurality of sensor strings.

One aspect in accord with the present invention is directed to a Power over Ethernet (PoE) distributed sensor system, the system comprising an interface unit comprising a plurality of ports, a plurality of sensor strings, each sensor string comprising a plurality of sensor units daisy chained together and coupled to one of the plurality of ports of the interface unit, and means for intelligently passing power from sensor unit to sensor unit within each one of the plurality of sensor strings, powering each one of the plurality of sensor strings, wherein each one of the plurality of sensor units within a sensor string is configured to receive power and data from one of the interface unit and an adjacent one of the plurality of sensor units within the sensor string and also to provide power and data to an adjacent one of the plurality of sensor units within the sensor string. In one embodiment, the distributed sensor system further comprises means for providing redundant power between at least two of the plurality of sensor strings.

Another aspect in accord with the present invention is directed to a distributed sensor network, the network comprising an interface unit comprising a plurality of ports, and a plurality of sensor strings, each sensor string comprising a plurality of sensor units coupled in series to one of the plurality of ports of the interface unit, wherein each one of the plurality of sensor units within a sensor string is configured to be provided both power and network connectivity via a first cable from one of the interface unit and an adjacent one of the plurality of sensor units within the sensor string and also to provide both power and network connectivity via a second cable to an adjacent one of the plurality of sensor units within the sensor string, and wherein a first string of the plurality of sensor strings is configured to be coupled to a second string of the plurality of sensor strings and wherein at least one of the plurality of sensor units within the first string is configured to provide power to at least one of the plurality of sensor units within the second string.

BRIEF DESCRIPTION OF DRAWINGS

The accompanying drawings are not intended to be drawn to scale. In the drawings, each identical or nearly identical component that is illustrated in various FIGS. is represented by a like numeral. For purposes of clarity, not every component may be labeled in every drawing. In the drawings.

DETAILED DESCRIPTION

Figure 1:
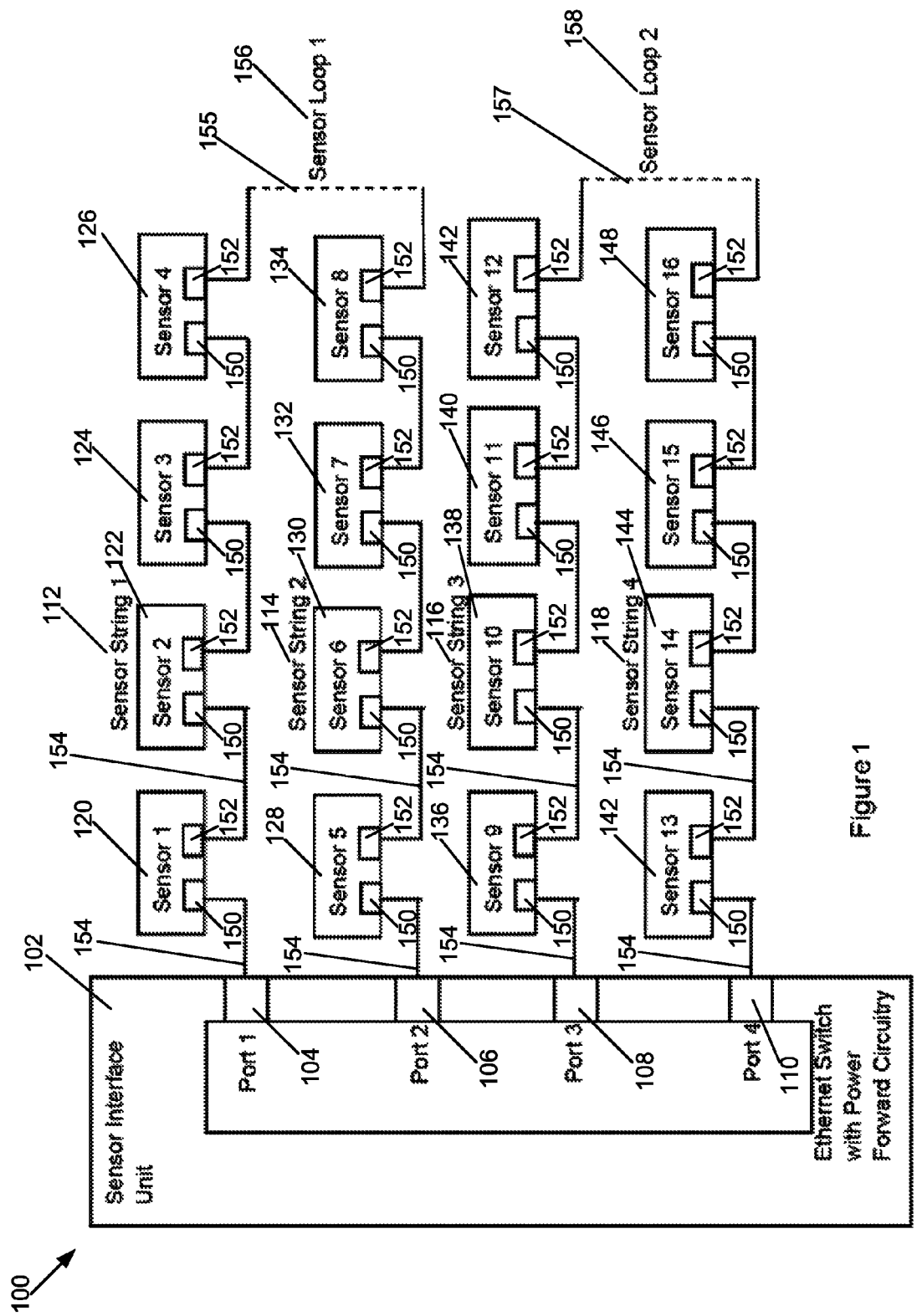
FIG. 1 is a block diagram of one embodiment of a daisy chained PoE sensor system in accordance with one aspect of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, typical PoE systems are configured in a "star topology" where one "hub" switch provides both Ethernet data switching and power supply functionality to one device on each one of the switches' ports. In such a system, a separate Ethernet cable is utilized to couple each device to its' associated port on the switch. Therefore, if such a common PoE topology is utilized within a distributed sensor system (e.g., within a vehicle), each sensor within the sensor system must be coupled directly to the switch with an individual Ethernet cable. If any of the sensors within the sensor system are located a relatively long distance away from the switch (e.g., at an opposite end of the vehicle than the switch), relatively long Ethernet cables must be utilized to couple the long distance sensors to the switch.

Within certain systems, the length of some of the cables within a common PoE topology based network may prove problematic due to certain size, weight, reliability and power restrictions of the system. For example, where a PoE network is desired to be utilized within a vehicle and/or within a distributed sensor system, the added weight and size requirements of a standard "star topology" PoE system due to the relatively long lengths of some cables may prove unworkable. Further, it may be desired that the number and/or overall length of cables within a system be reduced for a particular application.

Therefore, embodiments described herein provide a system in which devices are daisy chained together via Ethernet cables and power provided from a source through the Ethernet cables is intelligently passed from device to device, powering the string of devices. In addition, according to some embodiments, the system also provides redundant power, redundant network connectivity, and/or automatic fault detection and isolation for failed devices and cables.

FIG. 1 is a block diagram of one embodiment of a daisy chained PoE sensor system 100 in accordance with one aspect described herein. The sensor system 100 includes a sensor interface unit 102, a plurality of sensor units 120-148 and Ethernet cables 154, 155, 157. According to one embodiment, the Ethernet cables 154, 155, 157 are twisted-pair Ethernet cables; however, in other embodiments the Ethernet cables 154 utilize other Ethernet cable standards such as coaxial cable. According to another embodiment, the Ethernet cables 154, 155, 157 may be replaced by another type of cable capable of carrying both data and power. The sensor interface unit 102 includes a plurality of ports 104-110. Each sensor unit 120-148 includes a first port 150 and a second port 152.

A first sensor unit 120, second sensor unit 122, third sensor unit 124 and fourth sensor unit 126 are coupled in series to the first port 104 of the sensor interface unit 102 to form a first sensor string 112. The first port 150 of the first sensor unit 120 is coupled via an Ethernet cable 154 to the first port 104 of the sensor interface unit 102. The second port 152 of the first sensor unit 120 is coupled via an Ethernet cable 154 to the first port 150 of the second sensor unit 122. The second port 152 of the second sensor unit 122 is coupled via an Ethernet cable 154 to the first port 150 of the third sensor unit 124. The second port 152 of the third sensor unit 124 is coupled via an Ethernet cable 154 to the first port 150 of the fourth sensor unit 126.

A fifth sensor unit 128, sixth sensor unit 130, seventh sensor unit 132 and eight sensor unit 134 are coupled in series to the second port 106 of the sensor interface unit 102 to form a second sensor string 114. The first port 150 of the fifth sensor unit 128 is coupled via an Ethernet cable 154 to the second port 106 of the sensor interface unit 102. The second port 152 of the fifth sensor unit 128 is coupled via an Ethernet cable 154 to the first port 150 of the sixth sensor unit 130. The second port 152 of the sixth sensor unit 130 is coupled via an Ethernet cable 154 to the first port 150 of the seventh sensor unit 132. The second port 152 of the seventh sensor unit 132 is coupled via an Ethernet cable 154 to the first port 150 of the eighth sensor unit 134.

A ninth sensor unit 136, tenth sensor unit 138, eleventh sensor unit 140 and twelfth sensor unit 142 are coupled in series to the third port 108 of the sensor interface unit 102 to form a third sensor string 116. The first port 150 of the ninth sensor unit 136 is coupled via an Ethernet cable 154 to the third port 108 of the sensor interface unit 102. The second port 152 of the ninth sensor unit 136 is coupled via an Ethernet cable 154 to the first port 150 of the tenth sensor unit 138. The second port 152 of the tenth sensor unit 138 is coupled via an Ethernet cable 154 to the first port 150 of the eleventh sensor unit 140. The second port 152 of the eleventh sensor unit 140 is coupled via an Ethernet cable 154 to the first port 150 of the twelfth sensor unit 142.

A thirteenth sensor unit 142, fourteenth sensor unit 144, fifteenth sensor unit 146 and sixteenth sensor unit 148 are coupled in series to the fourth port 110 of the sensor interface unit 102 to form a fourth sensor string 118. The first port 150 of the thirteenth sensor unit 142 is coupled via an Ethernet cable 154 to the fourth port 110 of the sensor interface unit 102. The second port 152 of the thirteenth sensor unit 142 is coupled via an Ethernet cable 154 to the first port 150 of the fourteenth sensor unit 144. The second port 152 of the fourteenth sensor unit 144 is coupled via an Ethernet cable 154 to the first port 150 of the fifteenth sensor unit 146. The second port 152 of the fifteenth sensor unit 140 is coupled via an Ethernet cable 154 to the first port 150 of the sixteenth sensor unit 142.

The first sensor string 112 and the second sensor string 114 are coupled together via an Ethernet cable 155 to form a first sensor loop 156 between the first port 104 and the second port 106 of the sensor interface unit 102. The Ethernet cable 155 is coupled between the output 152 of the fourth sensor unit 126 and the output 152 of the eight sensor unit 134. The third sensor string 116 and the fourth sensor string 118 are coupled together via an Ethernet cable 157 to form a second sensor loop 158 between the third port 108 and the fourth port 110 of the sensor interface unit 102. The Ethernet cable 157 is coupled between the output 152 of the twelfth sensor unit 142 and the output 152 of the sixteenth sensor unit 148.

As described herein, the sensor interface unit 102 includes four ports 104-110; however, in other embodiments, the sensor interface unit may be configured with any number of ports. As also described herein, the sensor system 100 includes four sensor strings 112-118; however, in other embodiments, the sensor system 100 may be configured with any number of sensor strings. Also, as described herein, each sensor string includes four sensor units 120-148; however, in other embodiments, each sensor string may include any appropriate number of sensor units capable of being powered by the sensor interface unit 102.

In the sensor system 100, each sensor unit 120-148 is provided network connectivity (i.e. transmits and receives data to/from other devices in the sensor system 100) and is sourced over the Ethernet cables 154. According to one embodiment, each sensor 120-148 is provided network connectivity at each one of its ports 150, 152, is capable of receiving power at either one of its ports 150, 152, and is capable of providing power to either one of its ports 150, 152.

For example, according to one embodiment, one port of each sensor is designated an "upstream" port and the other port is designated a "downstream" port. In one embodiment, the "downstream" port of a sensor unit 120-148 is configured to receive power from a "downstream" source (e.g., from another sensor unit 120-148 or the sensor interface unit 102), the "upstream" port of the sensor unit 120-148 is configured to provide power to an "upstream" device (e.g., another sensor unit 120-148), and both the "upstream" and "downstream" ports 150, 152 are also configured to provide network connectivity to the sensor unit 120-148 (i.e., to allow the sensor unit 120-148 to communicate with other "upstream" or "downstream" devices).

In another embodiment, the "downstream" port of a sensor unit 120-148 is configured to provide power to a "downstream" device (e.g., another sensor unit 120-148), the "upstream" port of the sensor unit 120-148 is configured to receive power from an "upstream" source (e.g., another sensor unit 120-148), and both the "upstream" and "downstream" ports 150, 152 are also configured to provide network connectivity to the sensor unit 120-148 (i.e., to allow the sensor unit 120-148 to communicate with other "upstream" or "downstream" devices).

By sourcing each sensor unit 120-148 on either one of its ports 150, 152 in a daisy chained configuration as described, the weight of the sensor system 100 may be reduced. For example, in such a daisy chained configuration, even if a sensor unit 120-148 is a relatively long distance away from the central interface unit 102, the long distance sensor 120-148 must only be coupled to another nearby sensor, rather than directly to the central interface unit 102 (as typically done in a conventional PoE "star topology"). Accordingly, the relatively long (and relatively heavy) wires typically utilized in conventional PoE "star topology" network to couple a long distance sensor to a central switch are not required and may be replaced with relatively short (and relatively light) sensor to sensor cables, thus reducing the overall length of cable required for a particular implementation.

In addition, by configuring the sensor strings 112-118 in loops, redundant network connections and power delivery paths are also provided. For example, as shown in FIG. 1, the first sensor loop 156 provides redundant network connectivity and power delivery to sensor units one 120 to eight 134 and the second sensor loop 158 provides redundant network connectivity and power delivery to sensor units nine 136 through sixteen 148. In this way, network connectivity and power may be provided to each sensor unit 120-148 from either direction (i.e. from "upstream" or "downstream") in response to a detected fault in one of the loops 156, 158.

Each sensor unit 120-148 and the sensor interface unit 102 individually manages the connections to its neighboring device. For example, upon powering up, the sensor interface unit 102 enables power onto its ports 104-110. Power from each one of the ports 104-110 is provided to a first port 150 of a connected sensor unit (e.g., first, fifth, ninth and thirteenth sensor units 120, 128, 136, 142, respectively) to power up each sensor unit. Upon completion of their power on sequences, the first, fifth, ninth and thirteenth sensor units 120, 128, 136, 142 enable their power forwarding circuitry, thereby powering their upstream neighbors (e.g., the second, sixth, tenth and fourteenth sensor units 122, 130, 138, 144, respectively). This sequence may continue until all sensor units in each string are powered.

According to one embodiment, the power forwarding circuit design of each sensor unit 120-148 may utilize two levels of over-current protection. For example, when initially providing power to a neighboring sensor unit, a source sensor unit (e.g., first sensor unit 120) may set a "low" current limit which is sufficient to power the neighboring sensor unit (e.g., second sensor unit 122) but insufficient to immediately power sensor units further "upstream" or "downstream". Once the neighbor (e.g., the second sensor unit 122) is powered up, the source sensor (e.g., the first sensor unit 120) may then raise the over-current limit to a "high" current limit so as to allow its neighbor (e.g., the second sensor unit 122) to power other sensor units further "upstream" or "downstream" (e.g., third sensor unit 124). The two-level current limit is designed so that a short circuit or over-current fault condition on one link or sensor unit will be detected by the individual source sensor unit while attempting to power the faulty link or sensor unit in the "low" current limit state and the fault will not be propagated down the sensor string. In addition, by utilizing two levels of over-current protection, the system 100 can also determine the specific location in the system 100 where the fault exists.

Figure 2:
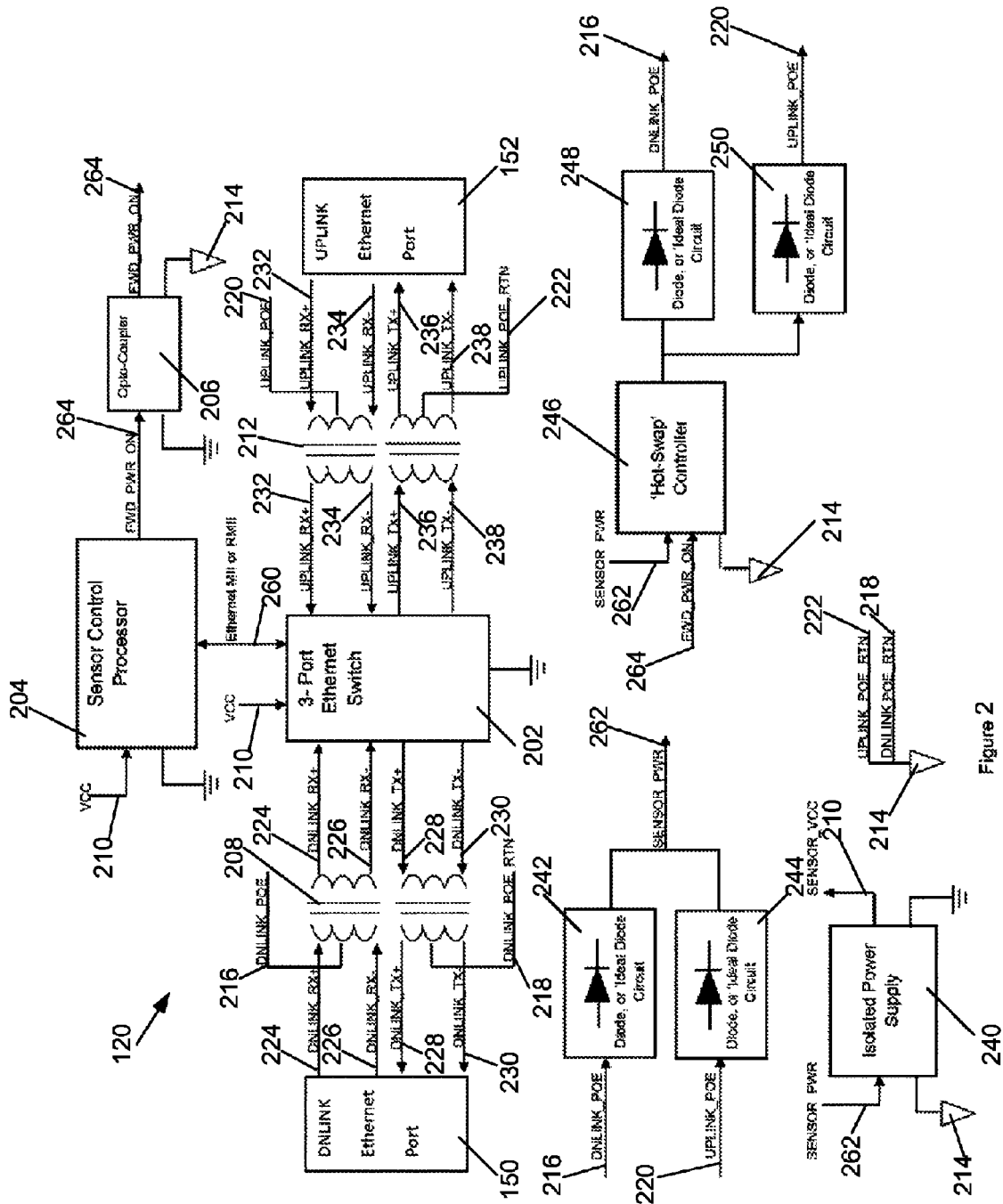
FIG. 2 is a block diagram of a sensor unit in accordance with one embodiment of the present invention.

FIG. 2 illustrates a block diagram of a sensor unit 120 in accordance with one aspect described herein. The sensor unit 120 includes an Ethernet switch 202, the first port 150 (i.e. a "downstream" port), the second port 152 (i.e. an "upstream port"), a sensor control processor 204, an optocoupler 206, a downstream transformer 208, an upstream transformer 212, a downstream PoE center tap 216, a downstream PoE return center tap 218, an upstream PoE center tap 220, an upstream PoE return center tap 222, downstream positive reception lines 224, downstream negative reception lines 226, downstream positive transmission lines 228, downstream negative transmission lines 230, upstream positive reception lines 232, upstream negative reception lines 234, upstream positive transmission lines 236, upstream negative transmission lines 238, a power supply 240, a downstream PoE diode 242, an upstream PoE diode 244, a "Hot-Swap" controller 246, a downstream "Hot-Swap" diode 248, and an upstream "Hot-Swap" diode 250.

In one embodiment, the Ethernet switch 202 is coupled to the "downstream" port 150 with reception lines 224, 226 and transmission lines 228, 230 via the downstream transformer 208. The Ethernet switch 202 is coupled to the "upstream" port 150 with reception lines 232, 234 and transmission liens 236, 238 via the upstream transformer 212. The Ethernet switch 202 is also coupled to the power supply 240 via a supply line (Vcc) 210. The Ethernet switch 202 is also coupled to the sensor control processor 204 via an interface line 260. According to one embodiment, the interface line 260 is a Media Independent Interface (MII) or a Reduced Media Independent Interface (RMII); however, in other embodiments, the interface line 260 may be configured differently.

The downstream PoE center tap 216 is coupled to the downstream transformer 208 between the downstream reception lines 224, 226. The downstream PoE return center tap 218 is coupled to the downstream transformer 208 between the downstream transmission lines 228, 230. The upstream PoE center tap 220 is coupled to the upstream transformer 212 between the upstream reception lines 232, 234. The upstream PoE return center tap 222 is coupled to upstream transformer 212 between the upstream transmission lines 236, 238. Both the downstream PoE return center tap 208 and the upstream PoE return center tap 222 are also coupled to ground 214. The downstream PoE center tap 216 is also coupled to a sensor power line 262 via the downstream PoE diode 242. The upstream PoE center tap 220 is also coupled to the sensor power line 262 via the upstream PoE diode 244. According to one embodiment, the downstream PoE diode 242 and the upstream PoE diode 244 are ideal diode circuits; however, in other embodiments, the diodes may be configured differently. The sensor power line 262 is coupled to the power supply 240 and to the "Hot-Swap" controller 246.

The sensor control processor 204 is coupled to the power supply 240 via the supply line (Vcc) 210. The sensor control processor 204 is also coupled to the opto-coupler 206 via a power forward control line 264. The power forward control line 264 is coupled from the opto-coupler 206 to the "Hot-Swap" controller 246. The "Hot-Swap" controller 246 is coupled to the downstream PoE center tap 216 via the downstream "Hot-Swap" diode 248 and to the upstream PoE center tap 220 via the upstream "Hot-Swap" diode 250. According to one embodiment, the downstream "Hot-Swap" diode 248 and the upstream "Hot-Swap" diode 250 are ideal diode circuits; however, in other embodiments, the diodes may be configured differently.

According to one embodiment, the sensor unit 120 is configured to be located in a sensor loop of a daisy chained PoE sensor system (e.g., in one of the sensor loops 156, 158 of the daisy chained PoE sensor system 100 described above in relation to FIG. 1). In such a system 100, a device connected to the sensor unit 120 at either its "downstream" port 150 or "upstream" port 152 may be a similar sensor (e.g., sensor unit 122) or the sensor interface unit 102. As described above, the sensor unit 120 may receive power and be provided network connectivity at either its "downstream" port 150 or its "upstream" port 152, forward power to the other port, and provide network connectivity to the other port.

If the sensor 120 is powered by the device (e.g., a similar sensor or the sensor interface unit 102) coupled to its "downstream" port 150, then sensor 120 receives power from the "downstream" device as a common mode DC voltage between the downstream reception line pair 224, 226 and the downstream transmission line pair 228, 230. The common-mode DC voltage between the downstream reception line pair 224, 226 and the downstream transmission line pair 228, 230 is received by the downstream PoE center tap 216 and the downstream PoE return center tap 218 and provided to the sensor power line 262 via the downstream PoE diode 242. The power provided to the sensor power line 262 is provided to the power supply 240 which generates supply voltage Vcc. Supply voltage Vcc is provided to different elements of the sensor 120 such as the Ethernet switch 202 and the sensor control processor 204.

Upon being adequately powered, the sensor 120 may then forward power on to a device (e.g., a similar sensor circuit) coupled to its "upstream" port 152. When power forwarding is desired, the sensor control processor 204 sends a power forward control signal to the "Hot-Swap" Controller 246 via the power forward control line 264 and the opto-coupler 206. The opto-coupler 206 may provide isolation between the sensor control processor 204 and the "Hot-Swap" controller 246. In response to the power forward control signal on the power forward control line 264, the "Hot-Swap" controller 246 provides power from the sensor power line 262 to the upstream PoE center tap 220 via the upstream "Hot-Swap" diode 250. Power provided by the sensor power line 262 to the upstream PoE center tap 220 is applied as a common-mode voltage between the upstream reception line pair 232, 234 and the upstream transmission line pair 236, 238. The device coupled to the "upstream" port 152 may then receive power from the sensor unit 120 on either one if its ports, power itself up, and forward power on as described above with regards to sensor unit 120.

In the configuration described above, the power in the sensor loop flows from the sensor units 120 "downstream" port 150, coupled to a "downstream" power source (e.g., a similar sensor or sensor interface unit 102), to the "upstream" port, coupled to an "upstream" device (e.g., a similar sensor). However, the reverse of this configuration is also possible where the sensor unit 120 is powered by a neighboring device (e.g., a similar sensor or sensor interface unit 102) coupled to the "upstream" port and power is forwarded to a neighboring device (e.g. a similar sensor) coupled to the "downstream" port.

For example, if the sensor 120 is powered by the device (e.g., a similar sensor or the sensor interface unit 102) coupled to its "upstream" port 152, the sensor 120 receives power from the "upstream" device as a common-mode DC voltage between the upstream reception line pair 232, 234 and the upstream transmission line pair 236, 238. The common-mode DC voltage between the upstream reception line pair 232, 234 and the upstream transmission line pair 236, 238 is received by the upstream PoE center tap 220 and the upstream PoE return center tap 222 and provided to the sensor power line 262 via the upstream PoE diode 244. The power provided to the sensor power line 262 is provided to the power supply 240 which generates supply voltage Vcc. Supply voltage Vcc is provided to different elements of the sensor 120 such as the Ethernet switch 202 and the sensor control processor 204.

Upon being adequately powered, the sensor 120 may then forward power on to a device (e.g., a similar sensor circuit) coupled to its "downstream" port 150. When power forwarding is desired, the sensor control processor 204 sends a power forward control signal to the "Hot-Swap" Controller 246 via the power forward control line 264 and the opto-coupler 206. The opto-coupler 206 may provide isolation between the sensor control processor 204 and the "Hot-Swap" controller 246. In response to the power forward control signal on the power forward control line 264, the "Hot-Swap" controller 246 provides power from the sensor power line 262 to the downstream PoE center tap 216 via the downstream "Hot-Swap" diode 248. Power provided by the sensor power line 262 to the downstream PoE center tap 216 is applied as a common-mode voltage between the downstream reception line pair 224, 226 and the downstream transmission line pair 228, 230. The device coupled to the "downstream" port 150 may then receive power from the sensor unit 120 on either one if its ports, power itself up, and forward power on as described above with regards to sensor unit 120.

According to one embodiment, the "Hot-Swap" controller 246 allows a neighboring device to safely connect to the port 150, 152 of an already powered sensor unit. For example, in one embodiment where a neighboring device is suddenly coupled to the port of an already powered sensor unit 120, the "Hot Swap" controller 246 of the powered sensor unit 120 applies the power from the sensor power line 262 to the port (i.e. to the neighboring device) in a controlled manner, allowing the neighboring device to be safely inserted (or removed) from the live sensor unit 120 and sensor loop. The device may also provide undervoltage, overvoltage, and/or overcurrent protection. According to one embodiment, the "Hot-Swap" controller 246 is an LT4256-3 Positive High Voltage Hot Swap Controller manufactured by Linear Technology of Milpitas, Calif.; however, in other embodiments another type of "Hot-Swap" controller may be utilized. According to another embodiment, the "Hot-Swap" controller 246 may be replaced by a controller that is not a "Hot-Swap" controller but that is capable of controlling power provided to the downstream PoE center tap 216 and upstream PoE center tap 220 from the sensor power line 262.

According to one embodiment, each sensor unit 120 not only provides power to a "downstream" or "upstream" device, but also performs data forwarding operations from one port to another. For example, in one embodiment, the Ethernet switch 202 may receive data from a "downstream" port 150 (coupled to a "downstream" device such as the sensor interface unit 102 or another similar sensor unit 120) via reception lines 224, 226 and forward the data to an "upstream" port 152 (coupled to an "upstream" device such as a similar sensor unit 120) via transmission lines 236, 238. In another embodiment, the Ethernet switch 202 may receive data from an "upstream" port 152 (coupled to an "upstream" device such as another similar sensor unit 120) via reception lines 232, 234 and forward the data to a "downstream" port 150 (coupled to a "downstream" device such as the sensor interface unit 102 or a similar sensor unit 120) via transmission lines 228, 230. Accordingly, as each sensor unit 120 may be placed as an intermediate sensor within a sensor string (i.e., between other devices in the string) and each sensor unit 120 includes a data-forwarding Ethernet switch 202, an overall length of a string of sensors may exceed the conventional permitted length limits of an Ethernet Cable.

In addition, according to one embodiment, the Ethernet switch 202 receives information from the control processor 204 via the interface line 260 and forwards the information to at least one of the "upstream" and "downstream" ports 150, 152. For example, according to one embodiment, the Ethernet switch 202 receives sensor data from the control processor 205 via the interface line 260 and forwards the sensor data to at least one of the "upstream" and "downstream" ports 150, 152.

Figure 3:
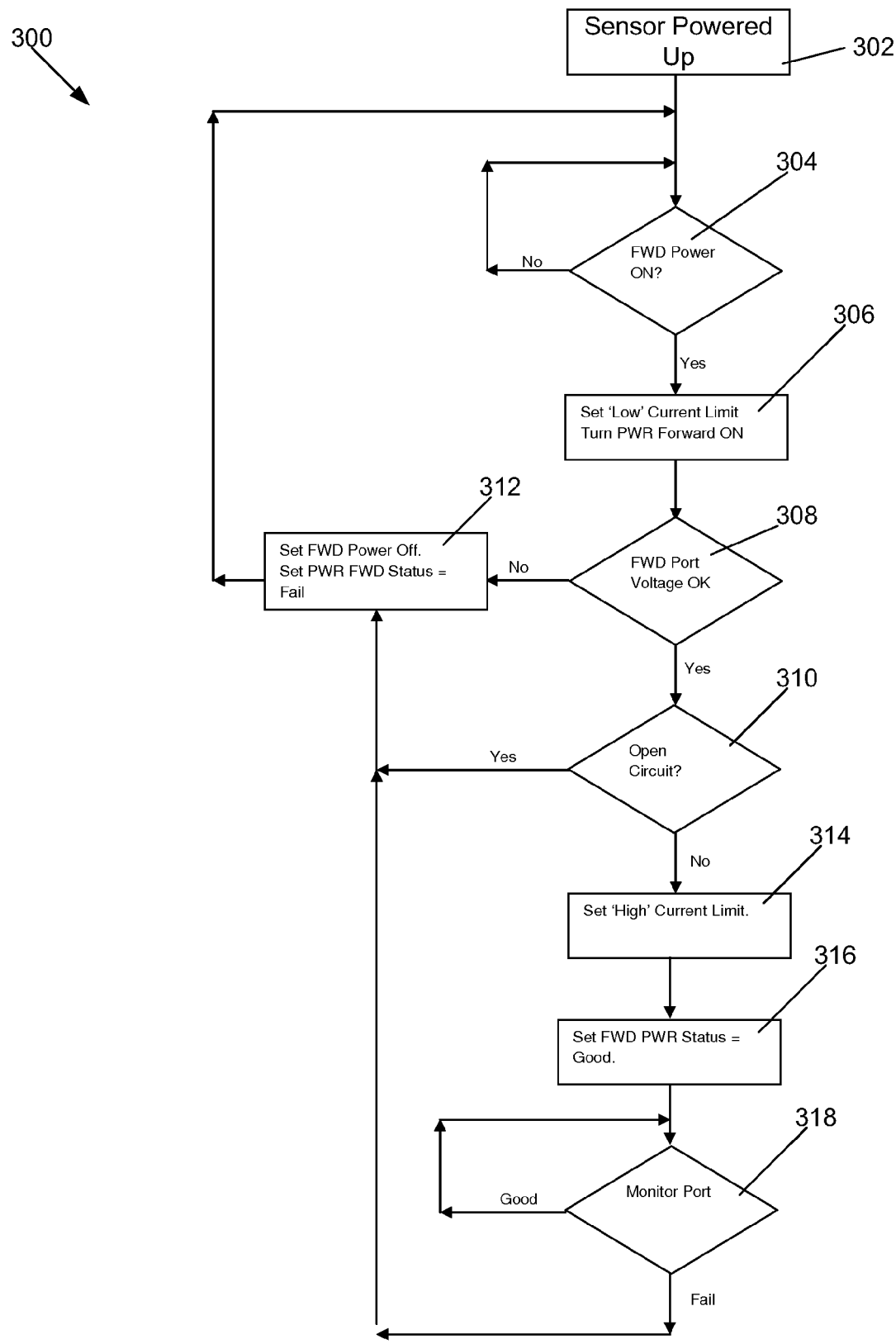
FIG. 3 is a state diagram of an individual sensor unit within a distributed sensor system, the sensor unit utilizing two levels of over-current protection, in accordance with one aspect of the present invention.

As discussed above, according one embodiment, the sensor unit 120 may utilize two levels of over-current protection. For example, FIG. 3 illustrates an example state diagram 300 of the individual sensor unit 120 within the distributed sensor system 100, the sensor unit 120 utilizing two levels of over-current protection.

At state 302, the sensor unit 120 is in a powered state after receiving power provided to one of the sensor unit's ports 150, 152 from a neighboring device (e.g., a similar sensor or sensor interface unit 102). At state 304, a determination is made by the sensor control processor 204 whether the processor 204 has received a signal from the sensor interface unit 102 indicating that the sensor unit 120 should enable power forwarding at a desired port. In response to a determination that the sensor unit 120 has not yet received a signal from the sensor interface unit 102 to begin power forwarding the sensor unit 120 remains in state 302.

In response to a determination by the sensor control processor 204 that a signal from the sensor interface unit 102 has been received indicating that the sensor unit 120 should forward power to a neighboring device (e.g., a similar sensor unit) via a desired port, at state 306 the sensor control processor 204 provides a power forward control signal to the "Hot-Swap" controller 246 via the power forward control line 264, enabling the "Hot-Swap" controller 246 to provide power to the desired port (i.e. to the neighboring device). Also in state 306, a "low" current limit is set for the power being provided to the desired port. As described above, the "low" current limit is chosen such that only a single sensor unit can be powered.

At state 308, a determination is made whether the voltage at the desired port is acceptable at the "low" current limit (i.e. a short-circuit condition is not present). In response to a determination that the voltage at the desired port is unacceptable, at state 312 the sensor control processor 204 sends a control signal to the "Hot-Swap" controller 246, controlling the controller 246 to stop providing power to the desired port. (e.g., disabling power forwarding of the sensor unit 120). Once power forwarding is disabled in the sensor unit 120, the sensor unit 120 returns to state 304 and the sensor control processor 204 awaits a signal from the sensor interface unit 102 to begin power forwarding.

In response to a determination that the voltage at the desired port is acceptable, at state 310 the sensor control processor 204 determines if there is an open-circuit condition present at the desired port. According to one embodiment, an open-circuit present condition would indicate that either the cable 154 adjoining the two sensors has failed, or that the neighboring sensor has failed in a way that is causing no power to be consumed on the desired port. In response to a determination that there is an open circuit at the desired port, the sensor unit transitions to state 312 and disables power forwarding of the sensor unit 120. In response to a determination that there is not an open circuit at the desired port, at state 314 the sensor control processor 204 sets a "high" current limit for the power being provided to the desired port. As discussed above, the "high" current limit is chosen such that it is sufficient to source current to the maximum number of sensor units in the sensor loop.

At state 316, the power forwarding status of the sensor unit 120 is labeled "Good" (i.e. the short-circuit and open-circuit tests have passed) and at state 318, the continued status of the desired port is monitored by the sensor control processor 204. In response to a determination that the status of the desired port is still "Good", the sensor control processor 204 continues to monitor the status of the desired port. In response to a determination that the status of the desired port is no longer "Good" (e.g., as a result of a fault occurring in the sensor unit 120, in the link to the neighboring device or in the neighboring device itself), the sensor unit transitions to state 312 and disables power forwarding of the sensor unit 120 to the desired port. The power forwarding process described above with regards to FIG. 3 may be repeated for each sensor unit within a sensor loop until all sensors within the loop are powered.

Figure 4:
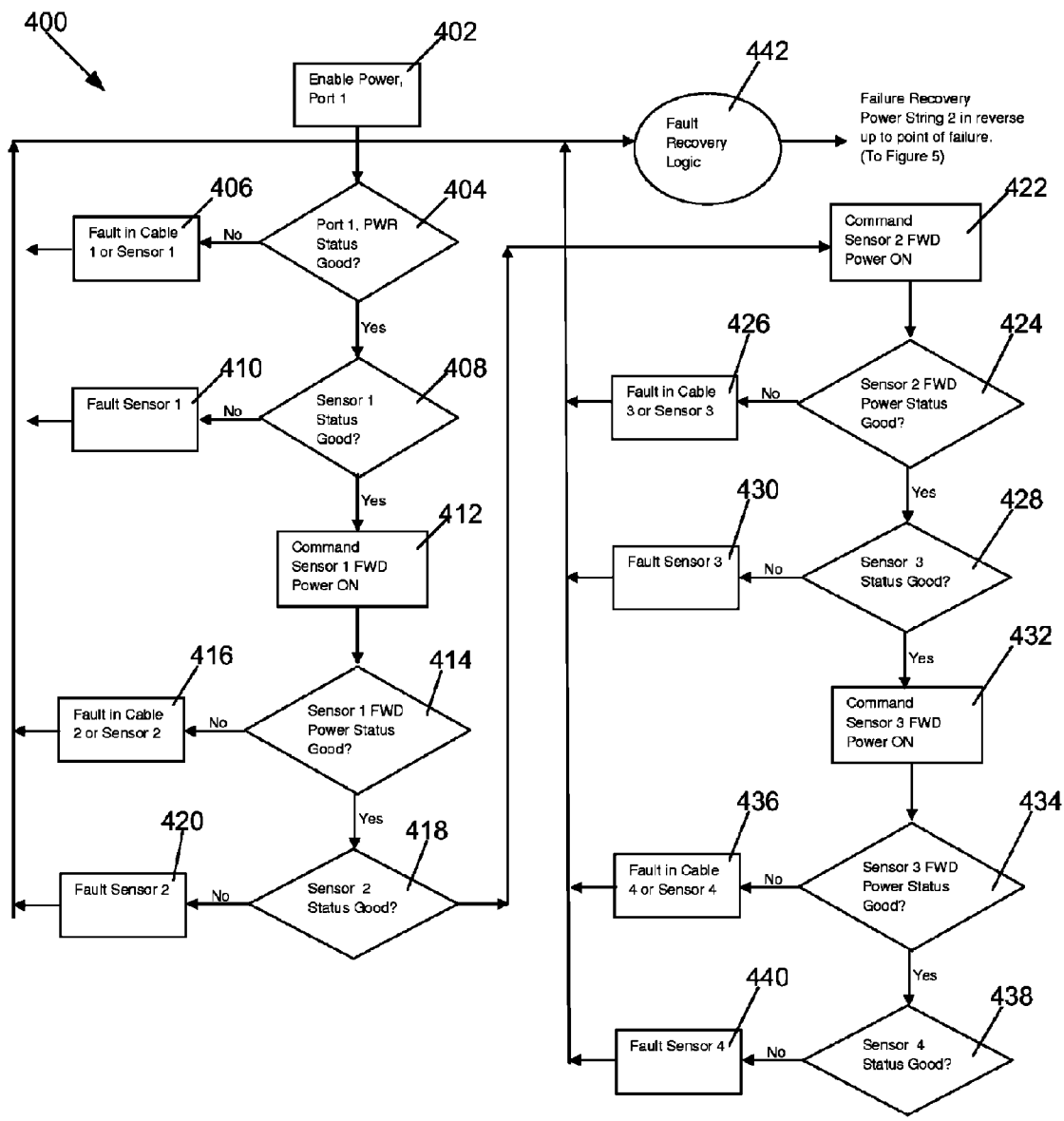
FIG. 4 is a state diagram of the powering of a sensor string coupled to a sensor interface unit within a sensor system in accordance with one aspect of the present invention.

In response to a failed condition (e.g., at state 312 of FIG. 3), the daisy chained PoE sensor system 100 may also provide redundant power, redundant network connectivity, and/or automatic fault detection and isolation. FIG. 4 illustrates a state diagram 400 of the powering of the first sensor string 112 coupled to the sensor interface unit 102 within the sensor system 100.

At state 402, the sensor interface unit 102 enables power at the first port 104 coupled to the first sensor unit 120. At state 404, a determination is made whether the power at the first port 104 is "Good" (i.e. the power at the first port passes the short-circuit and open-circuit tests described above with regards to FIG. 3). In response to a determination that the power at the first port is not "Good", at state 406 the sensor interface unit 102 identifies that there is either a fault in the cable connecting the sensor interface unit 102 to the first sensor 120 or there is a fault in the first sensor 120 itself. As a result, the sensor interface unit 102 initiates fault recovery logic at state 442. Fault recovery logic, at state 442, is discussed in greater detail below with regards to FIG. 5.

In response to a determination that the power at the first port is "Good", at state 408 the sensor interface unit 102 determines if the first sensor unit 120 has powered up appropriately. If powered up appropriately, the sensor interface unit 102 receives a signal from the sensor control processor 204 of the first sensor unit 120 indicating as such. In response to a determination that the first sensor unit 120 has not powered up appropriately, at state 410 the sensor interface unit 102 identifies that the first sensor unit 120 itself has failed. As a result, the sensor interface unit 102 initiates fault recovery logic at state 442.

In response to a determination that the first sensor unit 120 has powered up appropriately with power from the first port 104, at state 412 the sensor interface unit 102 sends a control signal to the first sensor unit 120, enabling power forwarding in the first sensor unit 102. In response to the power forwarding command from the sensor interface unit 102, the first sensor unit 120 provides power to the second sensor unit 122 as similarly described above with regards to FIG. 3. At state 414, a determination is made whether the power forwarding status of the first sensor unit 120 is labeled "Good". As described above with regards to FIG. 3, the power forwarding status of the first sensor unit 120 is labeled "Good" when the power at the desired port 152 of the first sensor unit 120 passes short-circuit and open-circuit tests while providing power to the port 150 of the second sensor unit 122.

In response to a determination that the power forwarding status of the first sensor unit 120 is not labeled "Good", at state 416 the sensor interface unit 102 identifies that there is a fault in either the cable 154 between the ports of the first sensor unit 120 and the second sensor unit 122 or in the second sensor unit 122 itself. As a result, the sensor interface unit 102 initiates fault recovery logic at state 442.

In response to a determination that the power forwarding status of the first sensor unit 120 is labeled "Good", at state 418 the sensor interface unit 102 determines if the second sensor unit 122 has powered up appropriately. If powered up appropriately, the sensor interface unit 102 receives a signal from the sensor control processor 204 of the second sensor unit 122 indicating as such. In response to a determination that the second sensor unit 122 has not powered up appropriately, at state 420 the sensor interface unit 102 identifies that the second sensor unit 122 itself has failed. As a result, the sensor interface unit 102 initiates fault recovery logic at state 442.

In response to a determination that the second sensor unit 120 has powered up appropriately with power from the first sensor unit 120, at state 422 the sensor interface unit 102 sends a control signal to the second sensor unit 122, enabling power forwarding in the second sensor unit 122. In response to the power forwarding command from the sensor interface unit 102, the second sensor unit 122 provides power to the third sensor unit 124 as similarly described above with regards to FIG. 3. At state 424, a determination is made whether the power forwarding status of the second sensor unit 122 is labeled "Good". As described above with regards to FIG. 3, the power forwarding status of the second sensor unit 122 is labeled "Good" when the power at the desired port 152 of the second sensor unit 122 passes short-circuit and open-circuit tests while providing power to the port 150 of the third sensor unit 124.

In response to a determination that the power forwarding status of the second sensor unit 122 is not labeled "Good", at state 426 the sensor interface unit 102 identifies that there is a fault in either the cable 154 between the ports of the second sensor unit 122 and the third sensor unit 124 or in the third sensor unit 124 itself. As a result, the sensor interface unit 102 initiates fault recovery logic at state 442.

In response to a determination that the power forwarding status of the second sensor unit 122 is labeled "Good", at state 428 the sensor interface unit 102 determines if the third sensor unit 124 has powered up appropriately. If powered up appropriately, the sensor interface unit 102 receives a signal from the sensor control processor 204 of the third sensor unit 124 indicating as such. In response to a determination that the third sensor unit 124 has not powered up appropriately, at state 430 the sensor interface unit 102 identifies that the third sensor unit 124 itself has failed. As a result, the sensor interface unit 102 initiates fault recovery logic at state 442.

In response to a determination that the third sensor unit 124 has powered up appropriately with power from the second sensor unit 122, at state 432 the sensor interface unit 102 sends a control signal to the third sensor unit 124, enabling power forwarding in the third sensor unit 124. In response to the power forwarding command from the sensor interface unit 102, the third sensor unit 124 provides power to the fourth sensor unit 126 as similarly described above with regards to FIG. 3. At state 434, a determination is made whether the power forwarding status of the third sensor unit 124 is labeled "Good". As described above with regards to FIG. 3, the power forwarding status of the third sensor unit 124 is labeled "Good" when the power at the desired port 152 of the third sensor unit 124 passes short-circuit and open-circuit tests while providing power to the port 150 of the fourth sensor unit 126.

In response to a determination that the power forwarding status of the third sensor unit 124 is not labeled "Good", at state 436 the sensor interface unit 102 identifies that there is a fault in either the cable 154 between the ports of the third sensor unit 124 and the fourth sensor unit 126 or in the fourth sensor unit 126 itself. As a result, the sensor interface unit 102 initiates fault recovery logic at state 442.

In response to a determination that the power forwarding status of the third sensor unit 124 is labeled "Good", at state 438 the sensor interface unit 102 determines if the fourth sensor unit 126 has powered up appropriately. If powered up appropriately, the sensor interface unit 102 receives a signal from the sensor control processor 204 of the fourth sensor unit 126 indicating as such. In response to a determination that the fourth sensor unit 126 has not powered up appropriately, at state 440 the sensor interface unit 102 identifies that the fourth sensor unit 126 itself has failed. As a result, the sensor interface unit 102 initiates fault recovery logic at state 442.

The powering of the first sensor string 112 as described above with regards to FIG. 4 may also be applied to other sensor strings (e.g., the second, third and fourth strings 114, 116, 118) coupled to other ports of the sensor interface unit 102. Also, according to one embodiment, the powering of a sensor string as described above with regards to FIG. 4 may also utilize two levels of over-current protection, as described above, when providing power from one sensor to another within a sensor string.

By "walking out" power along each sensor string (i.e. powering up individual sensor units along each sensor string one sensor unit at a time), the sensor interface unit 102 is able to identify the specific location of a fault within the sensor string (e.g., in a cable or in a sensor unit itself). In response to identifying the location of a fault, the sensor interface unit 102 is also able to recover from an identified fault as a result of the redundant configuration of each sensor loop 156, 158. For example, in a "normal" configuration where each sensor unit 120-148 of each sensor string 112-118 is powered and working appropriately, each sensor string 112-118 operates independently and redundant power and network connectivity is not provided between strings 112-118 (i.e. the fourth sensor unit 126 does not provide power or data to the eight sensor unit 134, and the twelfth sensor unit 142 does not provide power to the sixteenth sensor unit 148). However, upon detection of a fault, redundant power and network connectivity may be provided between sensor strings 112-118 using fault recovery logic.

Figure 5:
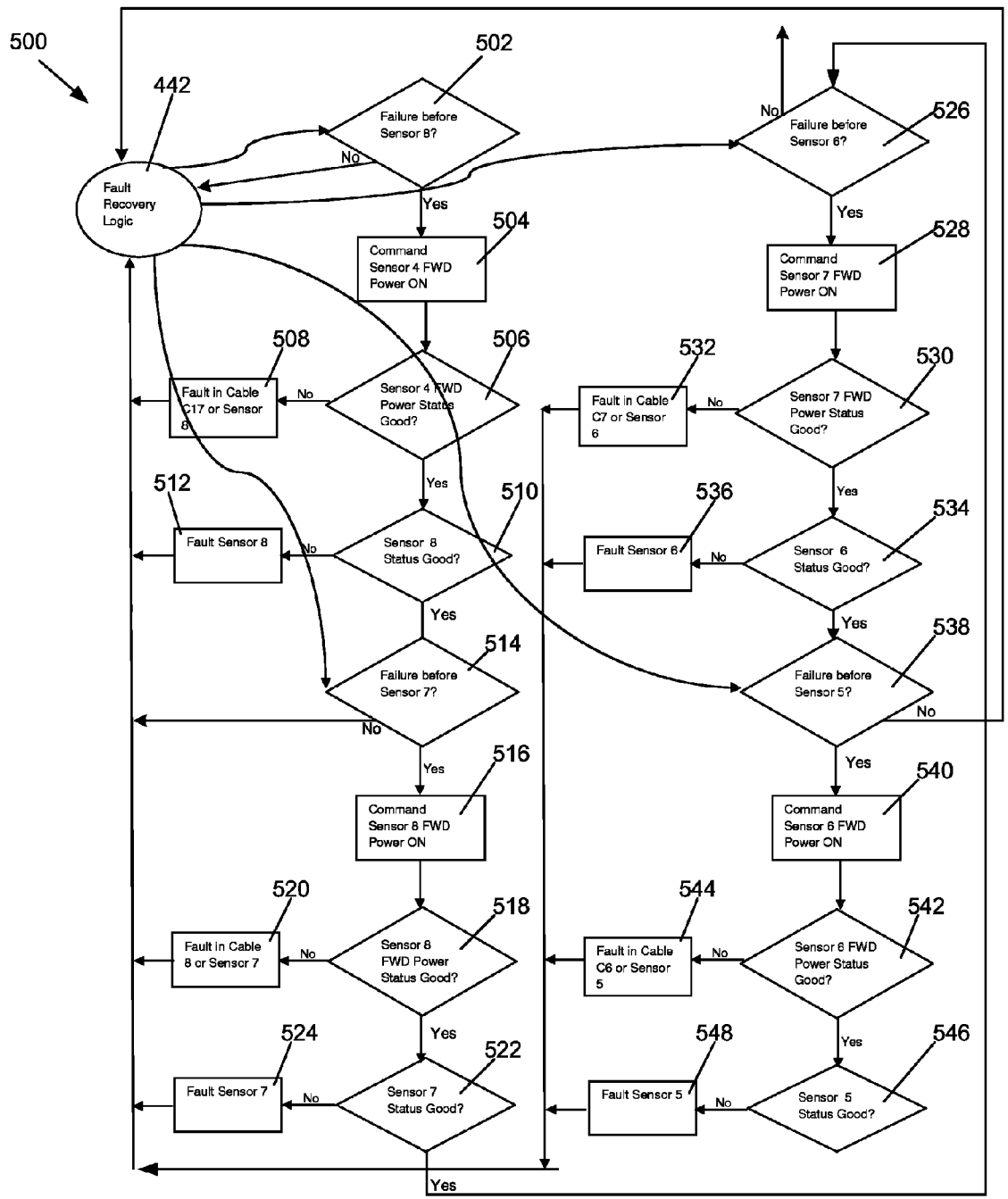
FIG. 5 is a state diagram of fault recovery logic of a sensor interface unit within a sensor system in accordance with one aspect of the present invention.

FIG. 5 illustrates a state diagram 500 of fault recovery logic of the sensor interface unit 102. As the sensor interface unit 102 "walks out" power to each sensor unit 120-148 (e.g., as described above with regards to FIG. 4), the sensor interface unit 102 monitors the system 100 for faults (e.g., that a power forwarding status of a port is not labeled "Good" and has failed as discussed above). When a fault is identified at a specific position in a sensor string 112-118 (e.g., in a cable 154 or sensor unit 120-148 itself), the sensor interface unit 102 identifies that sensors beyond the location of the fault where power forwarding has failed are not powered. The fault recovery logic attempts to power these un-powered sensors by "walking out" power in the opposite direction along the sensor loop 156, 158.

For example, upon entering the fault recovery logic state 442 after detecting a fault during the powering up of sensor units 128-134 in the second sensor string 114, the sensor interface unit 102 sends commands to desired sensor units to begin "walking out" power in the opposite direction (i.e. towards the sensor interface unit 102) along the second sensor string 114. At state 502, a determination is made whether the fault occurred in the second sensor string 114 before the eighth sensor unit 134. In response to a determination that the failure did not occur before the eighth sensor unit 134 in the second sensor string 114, the sensor interface unit 102 returns to the fault recovery logic at state 442.

In response to a determination that the failure did occur in the second sensor string 114 before the eighth sensor unit 134, at state 504 the sensor interface unit 102 sends a command to the fourth sensor unit 126 enabling power forwarding of the fourth sensor unit 126. In response to the command from the sensor interface unit 102, the fourth sensor unit 126 provides power to the eighth sensor unit 134 via the cable 155, as similarly discussed above.

At state 506, a determination is made whether the power forwarding status of the fourth sensor unit 126 is labeled "Good". As described above, the power forwarding status of the fourth sensor unit 126 is labeled "Good" in response to positive short-circuit and open-circuit test results at the second port 152 of the fourth sensor unit 126. At state 508, in response to a determination that the power forwarding status of the fourth sensor unit 126 is not "Good", the sensor interface unit 102 identifies that a fault exists in either the cable 155 between the fourth sensor unit 126 and the eighth sensor unit 134 or in the eighth sensor unit 134 itself. As a result, the sensor interface unit 102 initiates fault recovery logic at state 442.

In response to a determination that the power forwarding status of the fourth sensor unit 126 is labeled "Good", at state 510 the sensor interface unit 102 determines if the eighth sensor unit 134 has powered up appropriately. If powered up appropriately, the sensor interface unit 102 receives a signal from the sensor control processor 204 of the eighth sensor unit 134 indicating as such. In response to a determination that the eighth sensor unit 134 has not powered up appropriately, at state 512 the sensor interface unit 102 identifies that the eighth sensor unit 134 itself has failed. As a result, the sensor interface unit 102 initiates fault recovery logic at state 442.

In response to a determination that the eighth sensor unit 134 has powered up appropriately, the sensor interface unit 102, at state 514, determines whether the fault occurred in the second sensor string 114 before the seventh sensor unit 132. According to one embodiment, as shown in FIG. 5, the sensor interface unit 102 may also enter state 514 directly from the fault recovery logic state 442 (e.g., if the sensor interface unit 102 is aware, at the time of fault, that the eighth sensor unit 134 is already being powered appropriately from the fourth sensor unit 126 in the first sensor string 112). In response to a determination that the failure did not occur before the seventh sensor unit 132 in the second sensor string 114, the sensor interface unit 102 returns to the fault recovery logic at state 442.

In response to a determination that the failure did occur in the second sensor string 114 before the seventh sensor unit 132, at state 516 the sensor interface unit 102 sends a command to the eighth sensor unit 134 enabling power forwarding of the eighth sensor unit 134. In response to the command from the sensor interface unit 102, the eighth sensor unit 134 provides power to the seventh sensor unit 132 via the cable 154, as similarly discussed above.

At state 518, a determination is made whether the power forwarding status of the eighth sensor unit 134 is labeled "Good". As described above, the power forwarding status of the eighth sensor unit 134 is labeled "Good" in response to positive short-circuit and open-circuit test results at the second port 152 of the eighth sensor unit 134. At state 520, in response to a determination that the power forwarding status of the eighth sensor unit 134 is not "Good", the sensor interface unit 102 identifies that a fault exists in either the cable 154 between the eighth sensor unit 134 and the seventh sensor unit 132 or in the seventh sensor unit 132 itself. As a result, the sensor interface unit 102 initiates fault recovery logic at state 442.

In response to a determination that the power forwarding status of the eighth sensor unit 134 is labeled "Good", at state 522 the sensor interface unit 102 determines if the seventh sensor unit 132 has powered up appropriately. If powered up appropriately, the sensor interface unit 102 receives a signal from the sensor control processor 204 of the seventh sensor unit 132 indicating as such. In response to a determination that the seventh sensor unit 132 has not powered up appropriately, at state 524 the sensor interface unit 102 identifies that the seventh sensor unit 132 itself has failed. As a result, the sensor interface unit 102 initiates fault recovery logic at state 442.

In response to a determination that the seventh sensor unit 132 has powered up appropriately, the sensor interface unit 102, at state 526, determines whether the fault occurred in the second sensor string 114 before the sixth sensor unit 130. According to one embodiment, as shown in FIG. 5, the sensor interface unit 102 may also enter state 526 directly from the fault recovery logic state 442 (e.g., if the sensor interface unit 102 is aware, at the time of fault, that the seventh and eighth sensor units 132, 134 are already being powered appropriately from the first sensor string 112). In response to a determination that the failure did not occur before the sixth sensor unit 130 in the second sensor string 114, the sensor interface unit 102 returns to the fault recovery logic at state 442.

In response to a determination that the failure did occur in the second sensor string 114 before the sixth sensor unit 130, at state 528 the sensor interface unit 102 sends a command to the seventh sensor unit 132 enabling power forwarding of the seventh sensor unit 132. In response to the command from the sensor interface unit 102, the seventh sensor unit 132 provides power to the sixth sensor unit 130 via the cable 154, as similarly discussed above.

At state 530, a determination is made whether the power forwarding status of the seventh sensor unit 132 is labeled "Good". As described above, the power forwarding status of the seventh sensor unit 132 is labeled "Good" in response to positive short-circuit and open-circuit test results at the second port 152 of the seventh sensor unit 132. At state 532, in response to a determination that the power forwarding status of the seventh sensor unit 132 is not "Good", the sensor interface unit 102 identifies that a fault exists in either the cable 154 between the seventh sensor unit 132 and the sixth sensor unit 130 or in the sixth sensor unit 130 itself. As a result, the sensor interface unit 102 initiates fault recovery logic at state 442.

In response to a determination that the power forwarding status of the seventh sensor unit 132 is labeled "Good", at state 534 the sensor interface unit 102 determines if the sixth sensor unit 130 has powered up appropriately. If powered up appropriately, the sensor interface unit 102 receives a signal from the sensor control processor 204 of the sixth sensor unit 130 indicating as such. In response to a determination that the sixth sensor unit 130 has not powered up appropriately, at state 536 the sensor interface unit 102 identifies that the sixth sensor unit 130 itself has failed. As a result, the sensor interface unit 102 initiates fault recovery logic at state 442.

In response to a determination that the sixth sensor unit 130 has powered up appropriately, the sensor interface unit 102, at state 538, determines whether the fault occurred in the second sensor string 114 before the fifth sensor unit 128. According to one embodiment, as shown in FIG. 5, the sensor interface unit 102 may also enter state 538 directly from the fault recovery logic state 442 (e.g., if the sensor interface unit 102 is aware, at the time of fault, that the sixth, seventh and eighth sensor units 130, 132, 134 are already being powered appropriately from the first sensor string 112). In response to a determination that the failure did not occur before the fifth sensor unit 128 in the second sensor string 114, the sensor interface unit 102 returns to the fault recovery logic at state 442.

In response to a determination that the failure did occur in the second sensor string 114 before the fifth sensor unit 128, at state 540 the sensor interface unit 102 sends a command to the sixth sensor unit 130 enabling power forwarding of the sixth sensor unit 130. In response to the command from the sensor interface unit 102, the sixth sensor unit 130 provides power to the fifth sensor unit 128 via the cable 154, as similarly discussed above.

At state 542, a determination is made whether the power forwarding status of the sixth sensor unit 130 is labeled "Good". As described above, the power forwarding status of the sixth sensor unit 130 is labeled "Good" in response to positive short-circuit and open-circuit test results at the second port 152 of the sixth sensor unit 130. At state 544, in response to a determination that the power forwarding status of the sixth sensor unit 130 is not "Good", the sensor interface unit 102 identifies that a fault exists in either the cable 154 between the sixth sensor unit 130 and the fifth sensor unit 128 or in the fifth sensor unit 128 itself. As a result, the sensor interface unit 102 initiates fault recovery logic at state 442.

In response to a determination that the power forwarding status of the sixth sensor unit 130 is labeled "Good", at state 546 the sensor interface unit 102 determines if the fifth sensor unit 128 has powered up appropriately. If powered up appropriately, the sensor interface unit 102 receives a signal from the sensor control processor 204 of the fifth sensor unit 128 indicating as such. In response to a determination that the fifth sensor unit 130 has not powered up appropriately, at state 548 the sensor interface unit 102 identifies that the fifth sensor unit 128 itself has failed. As a result, the sensor interface unit 102 initiates fault recovery logic at state 442.

As discussed above, redundant power is implemented within the first sensor loop 156 (e.g., power from the first sensor string 112 is provided to the second sensor string 114); however, redundant power, as described above, may also be implemented within the second sensor loop 158 (e.g., power from the third sensor string 116 is provided to the fourth sensor string 118) or within another defined sensor loop (e.g., power from the first sensor string 112 may be provided to the fourth sensor string 118 and power from the second sensor string 114 may be provided to the third sensor string 116). As also discussed above, power may be provided from the first sensor string 112 to the second sensor string 114 to form a first sensor loop 156 and from the third sensor string 116 to the fourth sensor string 118 to form a second sensor loop 158; however, power may also similarly be provided from the second sensor string 114 to the first sensor string 112 to form the first sensor loop 156 and from the fourth sensor string 118 to the third sensor string 116 to form the second sensor loop 158.

By "walking out" power from a first sensor string to a second sensor string in which a fault is detected, the fault recovery logic is able to isolate the fault (e.g., the fault in a connection or sensor unit) and provide power from the first sensor string to the sensor units in the second sensor string that are beyond the identified fault (i.e. coupled between the location of the fault and the first sensor string. Also, according to one embodiment, the implementation of redundant power as described above with regards to FIG. 5 may also utilize two levels of over-current protection, as described above, when providing power from one sensor to another.

As described herein, a distributed sensor system intelligently provides redundant power to sensor units within the system. However, in addition to power, the distributed sensor system may also provide redundant network connectivity to sensor units within the system over the same Ethernet cables and ports. For example, in one embodiment, each one of the sensor units is provided network connectivity at both of its ports, allowing each sensor unit to communicate with other "upstream" or "downstream" devices within the network. If network connectivity at one port fails, the sensor unit may still maintain a connection to other devices in the system via the other port. According to another embodiment, sensor units may also provide network connectivity between sensor strings, as similar discussed above with regards to power.

As described herein, the sensor interface unit 102 provides power via ports 104-110 to the first sensor 120, the fifth sensor 128, the ninth sensor 136 and the thirteenth sensor 143 respectively; however, in other embodiments, the sensor interface unit 102 may be coupled to any other sensor unit at any other point within each sensor string.

As also described herein, each sensor unit 120 includes two ports; however, in other embodiments, a sensor unit 120 may include more than two ports. Also as described herein, each sensor unit 120 includes a single "upstream" port and a single "downstream" port; however, in other embodiments, any number of ports may be designated as "upstream" or "downstream. For example, in one embodiment, a sensor unit 120 receiving power at a single "downstream" port may forward the received power to multiple "upstream" ports.

Embodiments described herein provide a system in which devices are daisy chained together via Ethernet cables and power provided from a source through the Ethernet cables is intelligently passed from device to device, powering the string of devices. By powering devices within the system as described above, the space and weight requirements of the system may be reduced, allowing for placement of the system in a location in which a typical PoE system may be unworkable. In addition, according to some embodiments, the system also provides redundant power, redundant network connectivity, and/or automatic fault detection and isolation for failed devices and cables.

It is to be appreciated that a daisy chained PoE system, as described above, provides power forwarding capabilities (e.g., where a device may be both a supplier and consumer of power) and dual function capabilities (e.g., where a device is capable of being either a Powered Device (PD) or Power Sourcing Equipment (PSE) dependent on the configuration of the system) which are both typically not provided for in a standard PoE system. In addition, it is also to be appreciated that the daisy chained PoE system, as described above, may be able to operate at a voltage level (e.g., 12, 24 or 28V) lower than the standard operating voltage range (e.g., 37V to 57V) of a typical PoE system.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A method for providing power to a distributed sensor system, the distributed sensor system comprising an Ethernet based interface unit having a plurality of ports, and a plurality of sensor strings, each sensor string comprising a plurality of sensor units coupled in series to one of the plurality of ports of the interface unit, the method comprising:

providing power from at least one port of the interface unit to a first port of a first sensor unit of at least one of the plurality of sensor strings via a first Ethernet cable;

powering up the first sensor unit;

receiving, with the first sensor unit from the interface unit, a signal indicating that the first sensor unit should enable power forwarding at a second port of the first sensor unit;

in response to receiving the signal indicating that the first sensor unit should enable power forwarding at the second port, setting a low current limit for power provided by the second port to a first port of a second sensor unit in a first state, the low current limit set at a level sufficient to power only the second sensor in the first state;

in the first state, forwarding power at the low current limit from the second port of the first sensor unit to the first port of the second sensor unit of the at least one of the plurality of sensor strings via a second Ethernet cable;

monitoring a voltage at the second port of the first sensor unit;

determining whether the voltage at the second port of the first sensor in the first state indicates a short circuit condition;

in response to determining that the voltage at the second port of the first sensor unit in the first state indicates a short circuit condition, disabling power forwarding by the second port of the first sensor unit;

in response to determining that that the voltage at the second port of the first sensor unit in the first state does not indicate a short circuit condition, determining whether there is an open-circuit condition present at the second port of the first sensor unit;

in response to determining that there is an open-circuit condition present at the second port of the first sensor unit, disabling power forwarding by the second port of the first sensor unit;

in response to determining that there is not an open-circuit condition present at the second port of the first sensor unit, setting a high current limit for power provided by the second port to the first port of the second sensor unit in a second state, the high current limit set at a level sufficient to power a maximum number of sensor units in the at least one of the plurality of sensor strings;

in the second state, forwarding power at the high current limit from the second port of the first sensor unit to the first port of the second sensor unit via the second Ethernet cable;

monitoring the plurality of sensor strings for a fault condition; and in response to detecting a fault condition in a first sensor string of the plurality of sensor strings, providing power from a second one of the plurality of sensor strings to the first sensor string to provide power to at least one of the plurality of sensor units within the first sensor string.

2. The method of claim 1, wherein monitoring the plurality of sensor strings for a fault condition comprises monitoring the second port of the first sensor unit for an open-circuit or short-circuit condition while power is being forwarded to the first port of the second sensor unit.

3. The method of claim 1, further comprising:

forwarding power from a second port of the second sensor unit to a first port of a third sensor unit; and powering up the third sensor unit.

4. The method of claim 1, wherein providing power from the second one of the plurality of sensor strings to the first sensor string in response to detecting a fault condition in the first sensor string comprises:

identifying a location of the fault condition within the first sensor string; and providing power from the second one of the plurality of sensor strings to a group of sensor units within the first sensor string, the group of sensor units within the first sensor string coupled between the second sensor string and the location of the fault condition.

5. The method of claim 4, wherein providing power from the second one of the plurality of sensor strings to a group of sensor units coupled between the second sensor string and the location of the fault condition comprises:

powering up the third sensor unit within the first one of the plurality of sensor strings; and monitoring the second port of the third sensor unit within the second one of the plurality of sensor strings for a fault condition while power is being forwarded to the second port of the third sensor unit within the first one of the plurality of sensor strings.

6. The method of claim 5, further comprising:

in response to a determination that a fault condition at the second port of the third sensor unit within the second one of the plurality of sensor strings does not exist, forwarding power from a first port of the third sensor unit within the first one of the plurality of sensor strings to a second port of a fourth sensor unit within the first one of the plurality of sensor strings;

powering up the fourth sensor unit within the first one of the plurality of sensor strings; and monitoring the second port of the third sensor unit within the first one of the plurality of sensor strings for a fault condition while power is being forwarded to the second port of the fourth sensor unit within the first one of the plurality of sensor strings.

7. The method of claim 1, further comprising providing data from the at least one port of the interface unit to the first port of the first sensor unit of at least one of the plurality of sensor strings via the first Ethernet cable; and forwarding data from the second port of the first sensor unit to the first port of the second sensor unit of the at least one of the plurality of sensor strings via the second Ethernet cable.

* * * * *